No. 825,827. PATENTED JULY 10, 1906.
N. G. HANNA.
SIDE DELIVERY BUNCHER FOR MOWERS.
APPLICATION FILED JUNE 15, 1903.
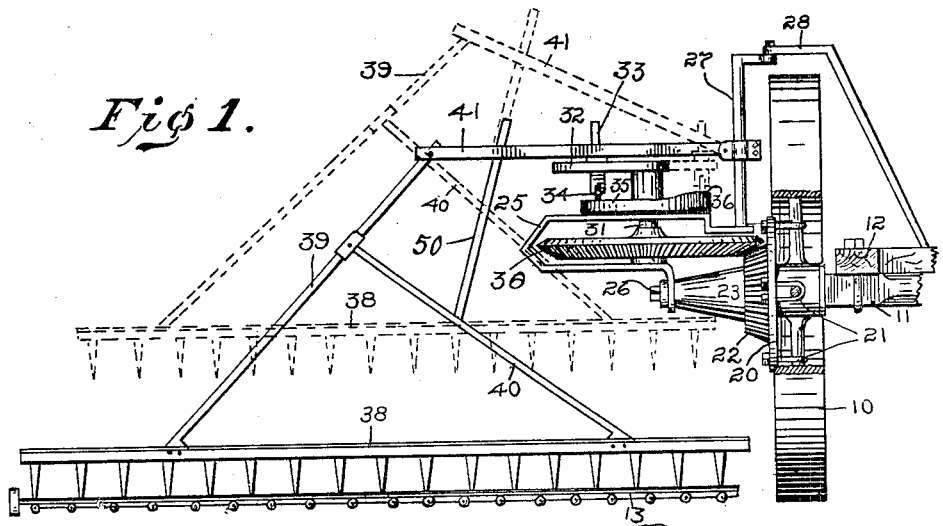
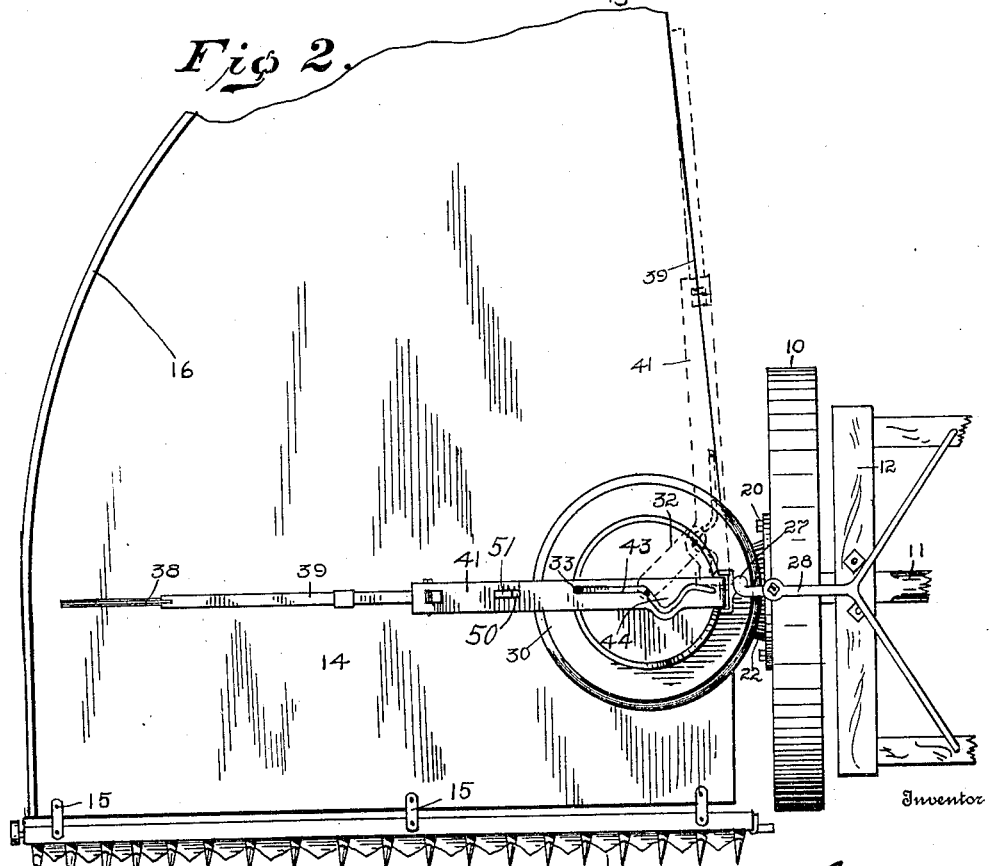

UNITED STATES PATENT OFFICE.

NELSON G. HANNA, OF KOKOMO, INDIANA, ASSIGNOR OF THREE-EIGHTHS TO VIRGIL H. LOCKWOOD, OF INDIANAPOLIS, INDIANA.

SIDE-DELIVERY BUNCHER FOR MOWERS.

No. 825,827.　　　　　Specification of Letters Patent.　　　　　Patented July 10, 1906.

Application filed June 15, 1903. Serial No. 161,515.

*To all whom it may concern:*

Be it known that I, NELSON G. HANNA, of Kokomo, county of Howard, and State of Indiana, have invented a certain new and useful Side-Delivering Buncher for Mowers; and I do hereby declare that the following is a full, clear, and exact description thereof, reference being had to the accompanying drawings, in which like numerals refer to like parts.

The object of this invention is to provide a convenient rake attachment for mowing-machines for bunching clover, peas, flax, or other grain, grass, or the like material.

This invention is an improvement on what is shown in my former application, filed June 2, 1902, Serial No. 109,848, for side-delivery bunchers.

The full nature of the invention will be understood from the accompanying drawings and the following description and claims.

In the drawings, Figure 1 is a front elevation of the inner part of a mowing-machine with my rake attachment in place, parts of the mowing-machine being broken away and parts omitted and showing the position of the rake on its return movement in dotted lines. Fig. 2 is a plan view of the same, showing the position of the rake during the discharge of the bunch in dotted lines.

In detail 10 is the inner transporting or driving wheel of the mowing-machine, 11 the axle, and 12 the frame, secured on the axle. 13 is a cutter-bar, and 14 a platform. These parts of the mechanism are old, and their exact construction is immaterial so far as this invention is concerned and are shown herein merely to illustrate my invention.

The platform, as shown here, drags behind the cutter-bar and is connected therewith by links 15. It has an upwardly-extending rim 16 on the side thereof next to the standing grain or grass to prevent any of the cut material from escaping from the wrong side of the platform.

In the first place a supplemental hub 23 is secured centrally to the side of the transporting-wheel. This supplemental hub has a plate 20 clamped to the spokes of the wheel by staples 21 and suitable nuts. On said supplemental hub and preferably integral therewith there is a bevel-gear 22, concentric with the axis of the transporting-wheel. The supplemental hub extends conically outward from said bevel-gear, and it and said gear rotate with the transporting-wheel. A rake-frame is mounted stationary on said supplemental hub, said rake-frame consisting in the form herein shown of a bracket 25 and a post 27. The bracket 25 is a casting substantially U-shaped, with one end perforated and fitting over a rounded reduced portion of the hub, so that the supplemental hub can turn in the frame freely. Said bracket is held on the hub by a washer and a nut 26.

The other end of the bracket 25 carries a vertical post 27, that extends above the driving-wheel 10, and is held in place at its upper end by a brace 28, that is secured to the frame of the machine. Said brace is preferably Y-shaped, so as to prevent the post 27 from having movement or play.

Between the two sides, the top and bottom of the bracket 25, I mount a bevel-gear 30 in a horizontal position, so as to mesh with the bevel-gear 22 on the driving-wheel. Said gear 30 is mounted on a shaft 31, that extends through and above the upper side of the bracket 25 and carries on its upper end a crank-arm 32, that extends horizontally and revolves as the gear 30 is actuated. The outer end of this crank-arm 32 carries a vertically-movable post 33, the lower portion of which is squared, preferably, and moves loosely up and down in a similar opening in the crank-arm 32 and has a shoulder, as seen in Fig. 1, to prevent its downward escape, and the upper portion is round or rod-like. In the lower end of the post 33 a caster or roller 34 is carried that travels around on a horizontal plate or track 35, that is secured stationary on the upper side of the bracket 25. This plate has a cam 36, that extends upward for elevating the post 33 as it travels about said track.

A rake 38 is mounted on the end of a bar 39 and a brace 40, and the bar 39 is pivoted in the outer end of a horizontal bar 41, which carries the rake. Said bar 41 is pivoted at its inner end to the post 27 and is oscillated and moved by the post 33 and crank-arm 32 and gear 30. As seen in Fig. 2, the rake-supporting bar 41 is provided with a longitudinal slot 43, that at one point bends inward around a point or shoulder 44 for the purpose of enabling the crank-arm 32 and post 33 to throw the rake farther around to the rear and to discharge the bundle without lengthening the crank-arm 32 so that it will interfere with the post 27 in its revolutions.

The operation is as follows: The driving-wheel actuates the gear 30, and it causes the arm 32 and post 33 to revolve rearward from the post shown in Fig. 1, and such movement carries the rake from the position shown in Fig. 1 to the dotted-line position shown in Fig. 2, and during that movement of the rake the upper end of the post 33 will travel from the outer end of the slot 43 to the middle of the bend in said slot, when the post 33 will be then bearing against the projection 44 in the bar 41, so as to throw the rake far enough to the rear to discharge the bundle. The further revolution of the crank-arm 32 will cause the return of the rake, and during such return movement the post 33 rides on the cam, as shown in dotted lines in Fig. 1, and lifts the rake over the bunch that is being formed to a position in front of it, when the post rides down off the cam and permits the rake to move down upon the platform in front of the bunch, and then it is swept again rearward.

The rake is strengthened or reinforced by a bar 50, pivoted at its lower end to the bar 40 and extending loosely through a slot 51 in the bar 41 some distance from the end thereof. The slot 51 is narrow, and the bar 41 is comparatively thick, so that the bar 50 will be held from much forward or rearward movement and tend to strengthen the rake while moving the bunch of clover or the like from the platform.

What I claim as my invention, and desire to secure by Letters Patent, is—

1. The combination with a mowing-machine having a transporting-wheel, of a rake mechanism removably clamped to the side of said wheel.

2. The combination with a mowing-machine having a transporting-wheel, of a rake, and means removably secured to the side of said wheel that supports and actuates the rake.

3. The combination with a mowing-machine having a wheel and axle, of a rake, means mounted at the end of the axle for supporting the rake, and means removably secured to the side of said wheel for actuating the rake.

4. The combination with a mowing-machine having two transporting-wheels and a main frame mounted between said wheels, of a rake mechanism removably secured to the outside of one of said transporting-wheels.

5. The combination with a mowing-machine having two transporting-wheels and a main frame mounted between them, of a rake mechanism at the outside of one of said transporting-wheels which is secured to, and the movable parts thereof actuated by said wheel.

6. The combination with a mowing-machine having two transporting-wheels and a main frame mounted between them, of a rake, means secured to the outside of one of said transporting-wheels and concentric with the axis of said wheel, and mechanism carried by said means that supports and actuates the rake.

7. The combination with a mowing-machine, of a rake mechanism comprising a rake, mechanism for supporting and driving the rake, and means for carrying said mechanism that is removably secured to the side of a transporting-wheel of the machine.

8. A rake mechanism for mowing-machines comprising a rake, means for supporting and driving said rake, and means for removably securing said rake supporting and driving means centrally to the side of a transporting-wheel.

9. A rake mechanism for mowing-machines comprising a rake-frame, means adapted to be secured centrally to the side of a transporting-wheel of the mowing-machine for supporting said rake-frame, means for preventing the rotation of the rake-frame, a rake mounted in connection with said frame, and means driven by the transporting-wheel for operating the rake.

10. A rake mechanism for mowing-machines comprising a supplementary hub adapted to be secured centrally to the side of a transporting-wheel to rotate therewith, a rake-frame mounted on said hub so that it may not rotate with the hub, means to prevent the rotation of said hub, a rake mounted in connection with said frame, and means driven by the rotation of the hub for operating the rake.

11. A rake mechanism for mowing-machines comprising a supplementary hub adapted to be secured centrally to one side of a transporting-wheel to rotate therewith, a rake-frame mounted on said hub, means to prevent the rotation of said frame with the hub, a rake mounted in connection with said frame, a gear secured on said hub, and means for transmitting power from the gear to the rake for operating the same.

12. A rake mechanism for mowing-machines comprising a supplementary hub, means for securing said hub centrally to the side of a transporting-wheel of the machine, a bevel-gear secured on said hub, a frame mounted on said hub, means to prevent the rotation of said frame, a bevel-gear mounted on said frame at a right angle to the bevel-gear on the hub and meshing therewith, a shaft mounted in the frame and driven by said bevel-gear, a rake pivoted to said frame, and means actuated by said shaft for operating the rake.

13. A rake mechanism for mowing-machines comprising a supplementary hub adapted to be secured centrally to one side of a transporting-wheel, a frame consisting of a bracket mounted on said hub, and a post secured to said bracket, braces for connecting said post with the frame of the machine for holding the post and bracket stationary.

14. A rake mechanism for mowing-machines comprising a supplementary hub adapted to be secured centrally to one side of a transporting-wheel, a vertically-disposed bevel-gear on said hub, a frame mounted upon said hub extending upward, means to maintain said frame in an upright position and keep it from rotation with the hub, a horizontally-disposed bevel-gear mounted in said frame so as to mesh with the bevel-gear on said hub, a shaft extending upward from said bevel-gear, a rake-bar pivoted on said frame and extending above said shaft and carrying the rake, and means actuated by said shaft for operating the rake.

15. In a rake mechanism for mowing-machines and the like, a rake, a rake-supporting frame, a rake-bar carrying the rake that is fulcrumed at one end, a horizontally-disposed track secured to the frame below the rake-bar, means that travels on said track for operating the rake and that is slidably connected with the rake-bar, and means for actuating said traveling means.

16. In a rake mechanism for mowing-machines and the like, a rake, a rake-supporting frame, a rake-bar carrying the rake, said rake-bar being fulcrumed at one end and having a cam-slot therein, a vertical shaft with an arm thereon, means in said arm that engages said rake-bar in the slot therein for causing the horizontal oscillation of the rake-bar, a shoulder on said means for holding the rake-bar from engaging said arm, a horizontally-disposed track beneath the rake-bar with its surface formed to cause the vertical movement of the rake-bar.

17. In a rake mechanism for mowing-machines and the like, a rake, a rake-supporting frame, a rake-bar carrying the rake that is fulcrumed at one end and that has a cam-slot therein, a horizontally-disposed track secured to the frame below the slotted portion of the rake-bar, a shaft concentric with said track, an arm secured on said shaft and revoluble thereby, and means carried on the end of said arm that travels on said track and supports the rake-bar and extends loosely through the slot in said rake-bar.

18. A rake mechanism for mowing-machines comprising a supplementary hub adapted to be secured to the side of a transporting-wheel, a bevel-gear secured on said hub, a frame mounted on said hub so as not to rotate therewith, a shaft mounted in said frame, a bevel-gear on said shaft meshing with the bevel-gear on the hub, a horizontally-disposed plate secured on said frame concentric with the shaft, the upper surface of said plate being provided with a track, a rake-bar pivotally mounted at its inner end to said frame and extending over said plate, and means between said plate and rake-bar movable with reference to both that is secured to and revoluble by said shaft for operating the rake.

19. The combination with a mowing-machine, of a supplementary hub secured concentrically to one side of the driving-wheel, a frame mounted on said hub, means for holding said frame stationary, a gear-wheel mounted horizontally in said frame, a gear-wheel secured to the driving-shaft for meshing with said gear-wheel on the frame, a shaft on which said horizontal gear-wheel is mounted, a crank-arm carried by said shaft, a vertically-movable post mounted on said crank-arm, a track on which the lower end of said post rides during its revolutions, said track being provided at one point with an elevation, a rake, and means for mounting said rake that is pivotally mounted at its inner end and is actuated by said revolving post.

20. The combination with a mowing-machine, of a rake mechanism including a post, a horizontally-disposed bar pivoted at its inner end to the post, a rake attached to the outer end of said bar, said bar having a longitudinal slot in it that is curved at one point, and a horizontally-revolving crank with a pin extending upward through said slot, so that the rake will be operated and moved rearward far enough to discharge the bunch without lengthening the crank so that during its revolutions it will not interfere with the post.

21. The combination with a mowing-machine, of a rake-bar pivotally mounted at the end of the axle of the machine, means driven by the mowing-machine adapted to give said bar a horizontal sweep in its rearward movement and to elevate it on its return movement, and a rake mounted on the outer end of said rake-bar, the connection between the rake-bar and rake being such as to admit movement of the rake independently of the rake-bar.

22. The combination with a mowing-machine, of a rake-bar pivotally mounted at the end next to the machine, means driven by the mowing-machine adapted to give said bar a horizontal sweep in its rearward movement and to elevate it on its return movement, a rake suspended from the outer end of said bar so as to be capable of a swinging movement toward the machine, and a brace-bar pivotally connected with said rake, said rake-bar having a vertical slot in it through which said brace-bar loosely extends.

In witness whereof I have hereunto affixed my signature in the presence of the witnesses herein named.

NELSON G. HANNA.

Witnesses:
R. B. WEYER,
A. B. KIRKPATRICK.